(12) United States Patent
Lundin

(10) Patent No.: US 8,780,984 B2
(45) Date of Patent: Jul. 15, 2014

(54) LOSS-ROBUST VIDEO TRANSMISSION USING PLURAL DECODERS

(75) Inventor: Henrik Fahlberg Lundin, Sollentuna (SE)

(73) Assignee: Google Inc., Mountain View, CA (US)

(*) Notice: Subject to any disclaimer, the term of this patent is extended or adjusted under 35 U.S.C. 154(b) by 346 days.

(21) Appl. No.: 13/174,862

(22) Filed: Jul. 1, 2011

(65) Prior Publication Data

US 2012/0008681 A1  Jan. 12, 2012

Related U.S. Application Data

(60) Provisional application No. 61/363,859, filed on Jul. 13, 2010.

(30) Foreign Application Priority Data

Jul. 6, 2010  (EP) ..................................... 10168540

(51) Int. Cl.
 *H04N 7/26*  (2006.01)
 *H04N 7/68*  (2006.01)

(52) U.S. Cl.
 CPC .............................. *H04N 19/00939* (2013.01)
 USPC .................................................... 375/240.12

(58) Field of Classification Search
 CPC .............................................. H04N 19/00939
 USPC ............ 375/240.12, 240.29, 240.01; 370/521
 See application file for complete search history.

(56) References Cited

U.S. PATENT DOCUMENTS

| | | | |
|---|---|---|---|
| 5,537,155 A | 7/1996 | O'Connell | |
| 5,675,384 A | 10/1997 | Ramamurthy | |
| 5,684,714 A | * 11/1997 | Yogeshwar et al. | .......... 370/521 |
| 5,719,642 A | 2/1998 | Lee | |
| 6,141,053 A | 10/2000 | Saukkonen | |
| 6,236,682 B1 | 5/2001 | Ota | |

(Continued)

FOREIGN PATENT DOCUMENTS

| | | |
|---|---|---|
| EP | 0806866 | 11/1997 |
| EP | 1578116 | 9/2005 |

(Continued)

OTHER PUBLICATIONS

International Preliminary Report on Patentability and Written Opinion for International Application No. PCT/US2011/042795 dated Jan. 17, 2013 (6 pp).

(Continued)

*Primary Examiner* — Richard Torrente
*Assistant Examiner* — Joseph Suh
(74) *Attorney, Agent, or Firm* — Young Basile Hanlon & MacFarlane P.C.

(57) ABSTRACT

Disclosed herein is a method of decoding a sequence of prediction-coded video frames using a primary and a secondary state-dependent decoder. The method includes receiving an incomplete frame at the primary decoder, copying a state of the primary decoder into the secondary decoder, decoding and outputting the incomplete frame and subsequent frames at the primary decoder, receiving data restoring the incomplete frame, decoding the restored incomplete frame and subsequent frames at the secondary decoder until the secondary decoder has caught up with the primary decoder; and copying the state of the secondary decoder into the primary decoder; wherein the secondary decoder has access to the subsequent frames received after the incomplete frame.

15 Claims, 8 Drawing Sheets

(56) References Cited

U.S. PATENT DOCUMENTS

| | | | |
|---|---|---|---|
| 6,324,540 | B1 | 11/2001 | Khanna |
| 6,330,344 | B1 | 12/2001 | Kondo |
| 6,385,245 | B1 | 5/2002 | De Haan |
| 6,404,738 | B1 | 6/2002 | Reininger et al. |
| 6,411,602 | B2 | 6/2002 | Schoenblum et al. |
| 6,449,312 | B1 | 9/2002 | Zhang et al. |
| 6,456,591 | B1 | 9/2002 | Mishra |
| 6,483,874 | B1 | 11/2002 | Panusopone et al. |
| 6,535,238 | B1 | 3/2003 | Kressin |
| 6,700,934 | B2 | 3/2004 | Lin |
| 6,721,327 | B1 | 4/2004 | Ekudden et al. |
| 6,771,703 | B1 | 8/2004 | Oguz et al. |
| 6,937,770 | B1 | 8/2005 | Oguz et al. |
| 7,010,037 | B2 | 3/2006 | Ye et al. |
| 7,065,004 | B2 | 6/2006 | Jiao et al. |
| 7,450,640 | B2 | 11/2008 | Kim et al. |
| 7,584,475 | B1 | 9/2009 | Lightstone et al. |
| 2002/0009149 | A1 | 1/2002 | Rodriguez |
| 2002/0039386 | A1 | 4/2002 | Han et al. |
| 2002/0146071 | A1 | 10/2002 | Liu |
| 2002/0159525 | A1 | 10/2002 | Jeong |
| 2003/0007566 | A1 | 1/2003 | Peng |
| 2003/0012275 | A1* | 1/2003 | Boice et al. ............. 375/240.01 |
| 2005/0220444 | A1* | 10/2005 | Ohkita et al. ................ 386/125 |
| 2006/0062481 | A1 | 3/2006 | Suvanto |
| 2006/0093036 | A1 | 5/2006 | Park et al. |
| 2006/0222078 | A1 | 10/2006 | Raveendran |
| 2006/0285598 | A1 | 12/2006 | Tulkki |
| 2007/0009034 | A1 | 1/2007 | Tulkki |
| 2008/0046249 | A1 | 2/2008 | Thyssen et al. |
| 2008/0123754 | A1* | 5/2008 | Ratakonda et al. ...... 375/240.29 |
| 2008/0152258 | A1 | 6/2008 | Tulkki |
| 2008/0225735 | A1 | 9/2008 | Qiu et al. |
| 2009/0021588 | A1 | 1/2009 | Border |
| 2009/0067495 | A1 | 3/2009 | Au et al. |
| 2009/0271814 | A1 | 10/2009 | Bosscha |

FOREIGN PATENT DOCUMENTS

| | | | |
|---|---|---|---|
| FI | 115945 | | 8/2005 |
| WO | 96/11457 | A1 | 4/1996 |
| WO | 96/11457 | | 5/1998 |
| WO | 0233979 | | 4/2002 |
| WO | 02062072 | | 8/2002 |
| WO | 02067590 | | 8/2002 |
| WO | 02078327 | | 10/2002 |
| WO | 03043342 | | 5/2003 |

OTHER PUBLICATIONS

European Search Report for European Patent Application No. EP 10168540.2 dated Jan. 20, 2011.
Trista Pei-Chun Chen and Tsuhan Chen, Second-Generation Error Concealment for Video Transport Over Error Prone Channels, electrical computer Engineering, Carnegie Mellon University, Pittsburgh, PA 15213, U.S.A.
Mohammad Ghanbari, Postprocessing of Late Cells for Packet Video, IEEE Transactions on Circuits and Systems for Video Technology, vol. 6, No. 6, Dec. 1996.
Sunil Kumar, Liyang Xu, Mrinal K. Mandal, and Sethuraman Panchanathan, Error Resiliency Schemes in H.264/AVC Standard, Elsevier J. of Visual Communication & Image Representation (Special issue on Emerging H.264/AVC Video Coding Standard), vol. 17(2), Apr. 2006.
Yao Wang and Qin-Fan Zhu, Error Control and Concealment for Video Communication: A Review, IEEE Xplore, vol. 86, No. 5, May 1998.
Wang Yao, "Error Control and Concealment for Video Communication: A Review", Proceedings of the IEEE, vol. 86, No. 5, May 1998, 24 pages.
Ghanbari Mohammad, "Postprocessing of Late Calls for Packet Video", IEEE Transactions on Circuits and Systems for Video Technology, vol. 6, No. 6, Dec. 1996, 10 pages.
EP Search Report dated Jan. 20, 2011 for EP patent application # 10168540.2-1522.
"Series H: Audiovisual and Multimedia Systems; Infrastructure of audiovisual services- Coding of moving video; Advanced video coding for generic audiovisual services". H.264. Version 1. International Telecommunication Union. Dated May 2003.
"Series H: Audiovisual and Multimedia Systems; Infrastructure of audiovisual services- Coding of moving video; Advanced video coding for generic audiovisual services". H.264. Version 3. International Telecommunication Union. Dated Mar. 2005.
"Overview; VP7 Data Format and Decoder". Version 1.5. On2 Technologies, Inc. Dated Mar. 28, 2005.
"Series H: Audiovisual and Multimedia Systems; Infrastructure of audiovisual services- Coding of moving video; Advanced video coding for generic audiovisual services". H.264. Amendment 1: Support of additional colour spaces and removal of the High 4:4:4 Profile. International Telecommunication Union. Dated Jun. 2006.
"VP6 Bitstream & Decoder Specification". Version 1.02. On2 Technologies, Inc. Dated Aug. 17, 2006.
"Series H: Audiovisual and Multimedia Systems; Infrastructure of audiovisual services- Coding of moving video". H.264. Amendment 2: New profiles for professional applications. International Telecommunication Union. Dated Apr. 2007.
"VP6 Bitstream & Decoder Specification". Version 1.03. On2 Technologies, Inc. Dated Oct. 29, 2007.
"Series H: Audiovisual and Multimedia Systems; Infrastructure of audiovisual services- Coding of moving video". H.264. Advanced video coding for generic audiovisual services. Version 8. International Telecommunication Union. Dated Nov. 1, 2007.
"Series H: Audiovisual and Multimedia Systems; Infrastructure of audiovisual services- Coding of moving video". H.264. Advanced video coding for generic audiovisual services. International Telecommunication Union. Version 11. Dated Mar. 2009.
"Series H: Audiovisual and Multimedia Systems; Infrastructure of audiovisual services- Coding of moving video". H.264. Advanced video coding for generic audiovisual services. International Telecommunication Union. Version 12. Dated Mar. 2010.
Vos, Luc De and Stegherr, Michael; "Parameterizable VLSI Architectures for the Full-Search Block-Matching Algorithm", IEEE Transactions on Circuits and Systems, vol. 36, No. 10, Oct. 1989 New York US pp. 1309-1316.
Tsai et al., "Effective Subblock-Based and Pixel-Based Fast Direction Detections for H.264 Intra Prediction" in IEEE Transactions on Circuits and Systems for Video Technology, vol. 18, No. 7, Jul. 2008.
Tasdizen, et al; "A High Performance Reconfigurable Motion Estimation Hardware Architecture", Design, Automation & Test in Europe Conference & Exhibition, Apr. 20, 2009, IEEE, Piscataway, NJ, US pp. 882-885.
Vasudev Bhaskaran et al., "Chapter 6: The MPEG Video Standards", Image and Video Compression Standards- Algorithms & Architectures, Second Edition, 1997, pp. 149-230 Kluwer Academic Publishers.
Murat A. Tekalp, "Block-based methods", Digital video processing, Prentice Hall Processing Series, Aug. 12, 1995, pp. 98-116, Prentice Hall PTR.
Extended European Search Report in related matter EP10156468.
Ferzli, R., et al.; "No-Reference Objective Wavelet Based Noise Immune Image Sharpness Metric", IEEE International Conference on image processing, ICIP 2005, IEEE< Piscataway, NJ USA, vol. 1, Sep. 11, 2005, pp. 405-408.
Latecki, Longin Jan: "Image Similarity", Graduate Course: Computer Graphics and Image Processing, Sep. 27, 2004 (XP-002694202) Temple University, Philadelphia, retrieved from the internet: URL:http://www.cis.temple.edu/latecki/courses/CIS601-04/lectures_fall04.htm slides 5-8.
Finnish Search Report in corresponding application No. 20095273 dated Jan. 8, 2010.
Jang, C. Cho, H-G, Automated Digital photo Classification by Tessellated Unit Block Alignment Proceedings of the International Conference on Convergence and Hybrid Information Technology 2008 (ICHIT 2008), Aug. 28-29, 2008, pp. 204 to 210, Daejon, South Korea, XP 031319705.

* cited by examiner

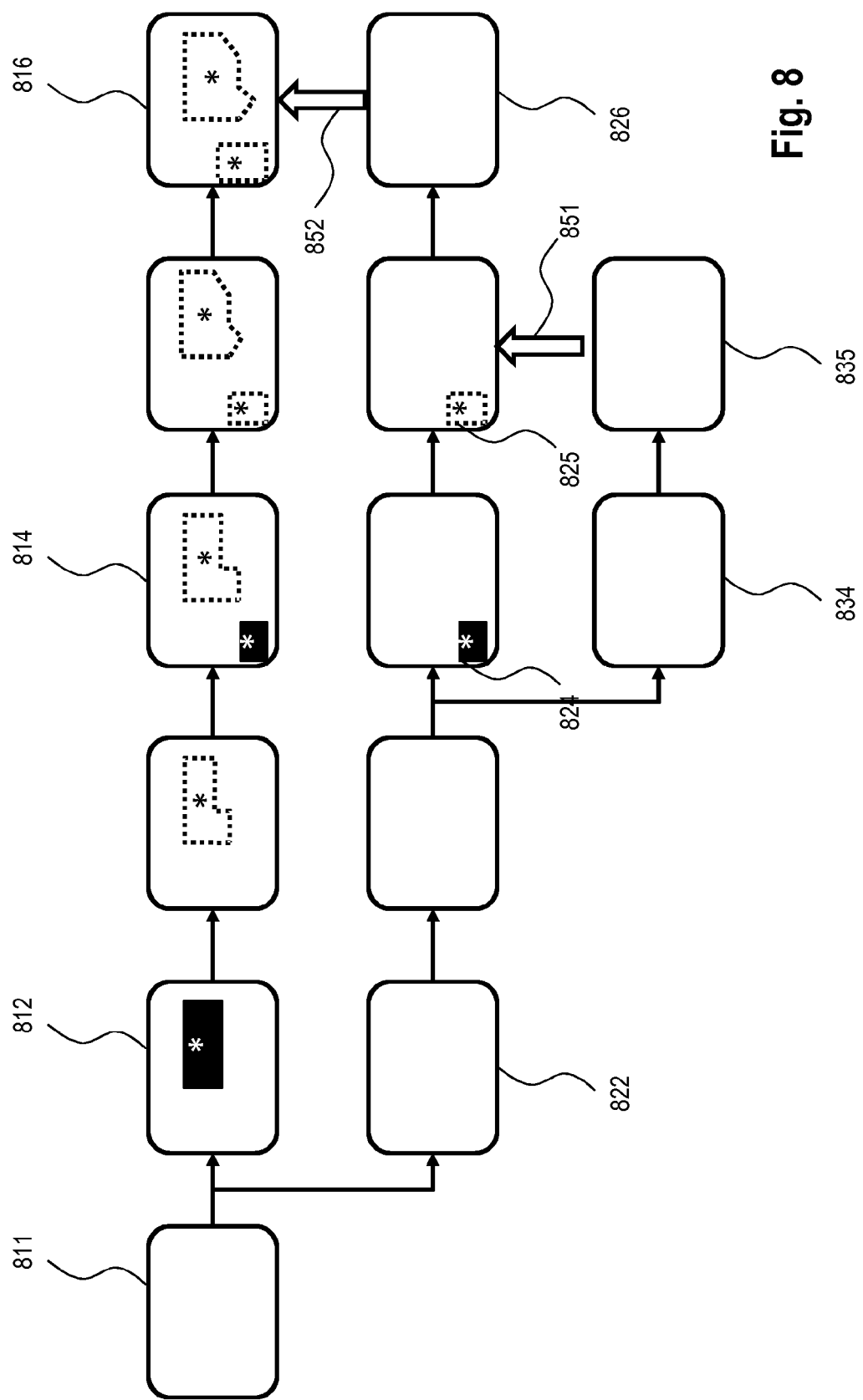

US 8,780,984 B2

LOSS-ROBUST VIDEO TRANSMISSION USING PLURAL DECODERS

CROSS-REFERENCE TO RELATED APPLICATIONS

This application claims priority to European Application Serial Number 10168540.2, filed Jul. 6, 2010, and U.S. Provisional Application Ser. No. 61/363,859, filed Jul. 13, 2010, both of which are incorporated herein by reference in their entireties.

TECHNICAL FIELD

The invention disclosed herein relates to transmission of video data over communication networks.

BACKGROUND

Digital video signals may be obtained by transducing a light pattern (electromagnetic waves, for example, in the visual spectrum) into an analogue video signal using an imaging device and subsequently obtaining a digital representation of the analogue video signal by sampling.

Prediction coding methods can be used for coding sequences of video frames. By such methods, a given frame can be expressed in terms of its difference with respect to one or more of the preceding frames. This idea can be applied to many image formats such as formats based on harmonic transforms or the discrete cosine transform (DCT) and its variants. Prediction coding can exploit the correlation between consecutive frames that is inherent in realistic video data so as to provide a low-bitrate coding format. In some instances, this efficiency, however, is achieved at a certain cost: a prediction-coded video sequence may only be decoded sequentially. In other words, the prediction-coded sequence may only be decoded in the same order as it was encoded so that frames preceding the one to be decoded are known. Further, in some instances, prediction decoders may not be able to skip forward in the video sequence and omit one or more frames whilst maintaining error-free decoding. Put differently, the decoder is a state-dependent (or stateful or memoryful) device, and the way it processes information relating to a given frame can depend on the previously decoded frame(s).

Transmission services over Internet Protocol (IP) networks can be supplied on a best-effort basis. A best-effort basis can include no guarantees as to whether a data packet will reach its addressee or how soon. When prediction-coded video frames are supplied in real time over an IP network, it may happen that a video frame is lost, is delivered incomplete or contains errors. The decoding process may not be able to continue in an error-free manner until the frame has been restored.

SUMMARY

Embodiments of a method of decoding a sequence of prediction-coded video frames using a primary and a secondary state-dependent decoder are disclosed herein. In one embodiment, the method includes receiving an incomplete frame at the primary decoder, copying a state of the primary decoder into the secondary decoder and decoding and outputting the incomplete frame and subsequent frames at the primary decoder. The method also includes receiving data restoring the incomplete frame, decoding the restored incomplete frame and subsequent frames at the secondary decoder until the secondary decoder has caught up with the primary decoder and copying the state of the secondary decoder into the primary decoder. The secondary decoder has access to the subsequent frames received after the incomplete frame.

In another embodiment, the method includes receiving and decoding the sequence at the primary and the secondary decoder in parallel. Decoded frames are output by the primary decoder. The method also includes receiving an incomplete frame, decoding and outputting the incomplete frame and subsequent frames at the primary decoder and receiving data restoring the incomplete frame at the secondary decoder. The method also includes decoding the restored incomplete frame and subsequent frames at the secondary decoder until the secondary decoder has caught up with the primary decoder and copying the state of the secondary decoder into the primary decoder.

Embodiments of a state-dependent secondary decoder for supporting a primary state-dependent decoder when the primary decoder receives an incomplete frame are also disclosed herein. The primary decoder is configured to receive, decode and output a sequence of prediction-coded video frames. The secondary decoder includes a memory and at least one processor configured to execute instructions stored in the memory to respond to receipt of a state copied from the primary decoder by accepting the state and receiving data restoring the incomplete frame. The at least one processor is also configured to execute instructions stored in the memory to respond to receipt of the state copied from the primary decoder by decoding the restored incomplete frame and subsequent frames received after the incomplete frame until it has caught up with the primary decoder and copying the state into the primary decoder. The secondary decoder has access to the frames received after the incomplete frame.

In another embodiment, the secondary decoder includes a memory and at least one processor configured to execute instructions stored in the memory to receive and decode the sequence in parallel to the primary decoder and respond to receipt of an incomplete frame by interrupting its decoding until it receives data restoring the incomplete frame, decoding the restored incomplete frame and subsequent frames until it has caught up with the primary decoder; and copying its state into the primary decoder.

Embodiments of a decoder system for decoding a sequence of prediction-coded video frames are disclosed herein. In one embodiment, the system includes a state-dependent primary decoder configured to receive, decode and output the sequence and a state-dependent secondary decoder communicatively connected to the primary decoder. The secondary decoder is configured to respond to receipt of an incomplete frame by: copying its state into the secondary decoder before decoding the incomplete frame, decoding the incomplete frame and subsequent frames and accepting a state copied from the secondary decoder.

In another embodiment, the system includes a state-dependent primary decoder configured to receive, decode and output the sequence and a state-dependent secondary decoder communicatively connected to the primary decoder. The secondary decoder is configured to receive and decode the sequence in parallel to the primary decoder and respond to receipt of an incomplete frame by: interrupting its decoding until it receives data restoring the incomplete frame; decoding the restored incomplete frame and subsequent frames until it has caught up with the primary decoder; and copying its state into the primary decoder.

These and other embodiments will be described in additional detail hereinafter.

BRIEF DESCRIPTION OF THE DRAWINGS

The description herein makes reference to the accompanying drawings wherein like reference numerals refer to like parts throughout the several views, and wherein:

FIG. 8 illustrates a schematic diagram of decoding using three sub-decoders according to another embodiment.

DETAILED DESCRIPTION

Various techniques to combat error propagation have been proposed and used. One current technique requests retransmission of lost packets before decoding the frame. Retransmission can be implemented using negative acknowledgment (NACK), for instance by the Real-Time Transport Control Protocol (RTCP). One benefit of using a retransmission scheme is, for example, that the decoder will not operate on anything but complete error-free frames. Using retransmission error control is optimal in the sense that only the information lost in transmission is retransmitted. However, this comes at the cost of increased latency, since the retransmitted data cannot arrive at the decoder until at least one round-trip time between sender and receiver has elapsed. To avoid freezing of the video playback while it waits for the missing data, the receiver may have to add at least one round-trip time of delay as a preliminary measure. This time is added to the end-to-end conversational delay in telephony applications. Over short distances, the extra delay inflicted may be negligible, but for long-distance calls it may be necessary to add 200 ms or more, which causes great annoyance and hampers the conversation.

Figure 1:
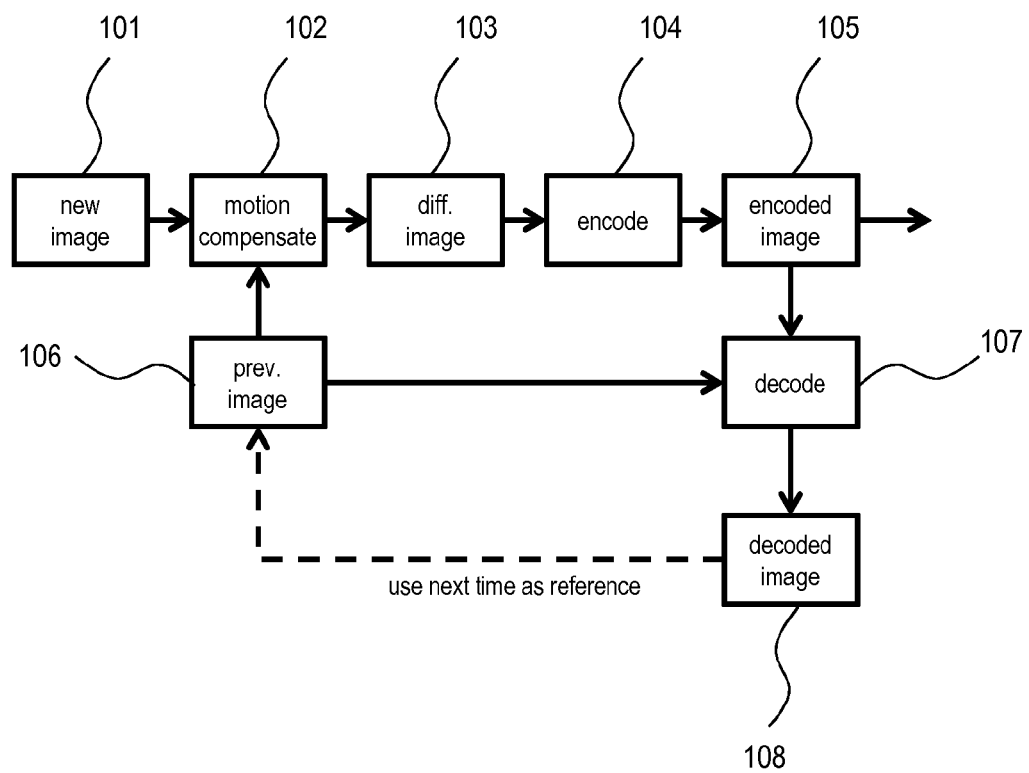
FIG. 1 illustrates a conventional predictive encoding process.

Other prediction-coding techniques include measures to limit the length of the backward history required to decode a given frame. As one example, each frame is encoded either as a stand-alone I-frame (or intra-coded frame) or as a predictive P-frame (or inter-coded frame) encoded using references to previously encoded frames. The first frame in a sequence can be coded as an I-frame. Unable to rely on information already encoded in other frames, an I-frame generally occupies more data than a P-frame. As shown in FIG. 1, a new frame 101 is first divided into smaller blocks, and the motion of each block is estimated 102 by searching for similarity in the previous frames. The difference 103 between the block and the best match in previous frames is then encoded 104 using a spatial decorrelation transform such as a discrete cosine transform (DCT). FIG. 1 illustrates how an encoded frame 105 depends on the preceding encoded frame 106. Subsequently, in the decoder (not shown), the decoding of a frame relies on access to the previously decoded frame in memory, which is used as reference in the motion compensation, allowing a correct decoded image to be obtained. This predictive decoding process is mimicked at the encoder side in an analysis-by-synthesis fashion. Thus, a decoding section 107 of the encoder provides data representing a previously decoded frame 108, which can be used as a reference in the encoder's motion compensation 102.

Figure 2A:
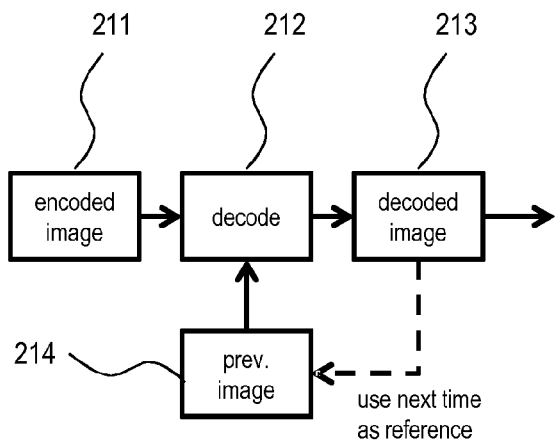
FIGS. 2A-C illustrate failure scenarios occurring in connection with the encoding process of FIG. 1.
Figure 2B:
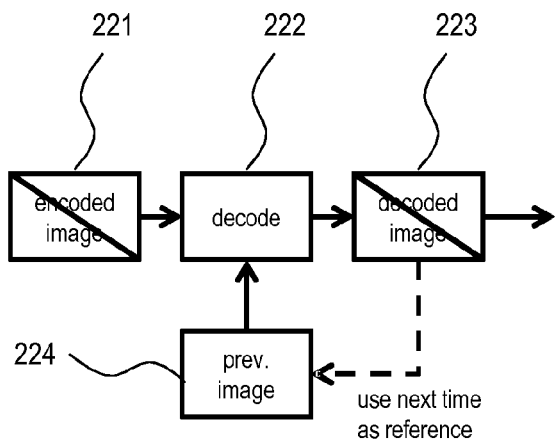
Figure 2C:
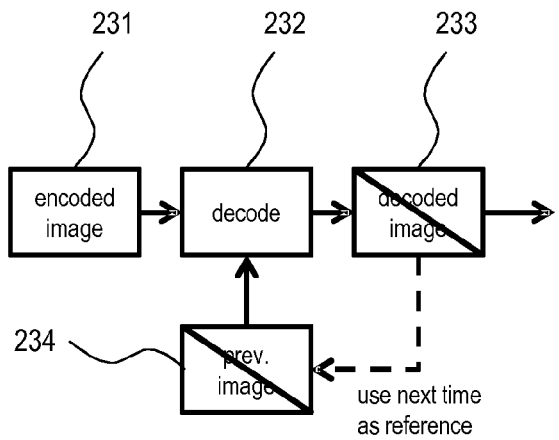

FIGS. 2A-2C illustrate examples of decoding P-frames, using either an I-frame or a P-frame as reference. FIG. 2A shows normal decoding 212 of a frame 211, by which an error-free previous frame 214 is used to obtain an error-free decoded image 213. While providing superior compression efficiency, this technique is vulnerable to packet losses, due to the dependencies between frames. If a portion of a frame is lost, an error occurs that may propagate through several subsequent frames. FIG. 2B shows that decoding 222 an encoded frame 221 with errors (e.g., caused by packet losses) renders a faulty decoded frame 223, as indicated by the diagonal bar, even though the previous frame 224 was complete and free from errors. Additionally, FIG. 2C shows how decoding 232 of an error-free encoded frame 231 also leads to an error in the decoded image 233 if the reference (previous) frame 234 is damaged.

In contrast to P-frames, I-frames are self-contained and can be decoded without access to any reference frame. Thus, as long as an I-frame is received correctly, it can be decoded correctly. In a decoder with a one-frame memory (or equivalently, a decoder the state of which depends only on the latest frame), the decoding of an I-frame can restore the decoder state to an error-free condition, so that any ongoing error propagation is stopped.

In prediction coding that provides for both I-frames and P-frames, another current technique can be used to increase robustness against packet losses: to insert a greater percentage of independently encoded (intra-coded) frames into the bit stream, which, as discussed above, act as barriers to error propagation. This approach does not suffer from additional transmission delay, as does the retransmission solution discussed initially. However, the coding efficiency declines when the I-frame-to-P-frame ratio increases implying that, at a given bitrate, a lower image quality must be accepted.

Figure 3A:
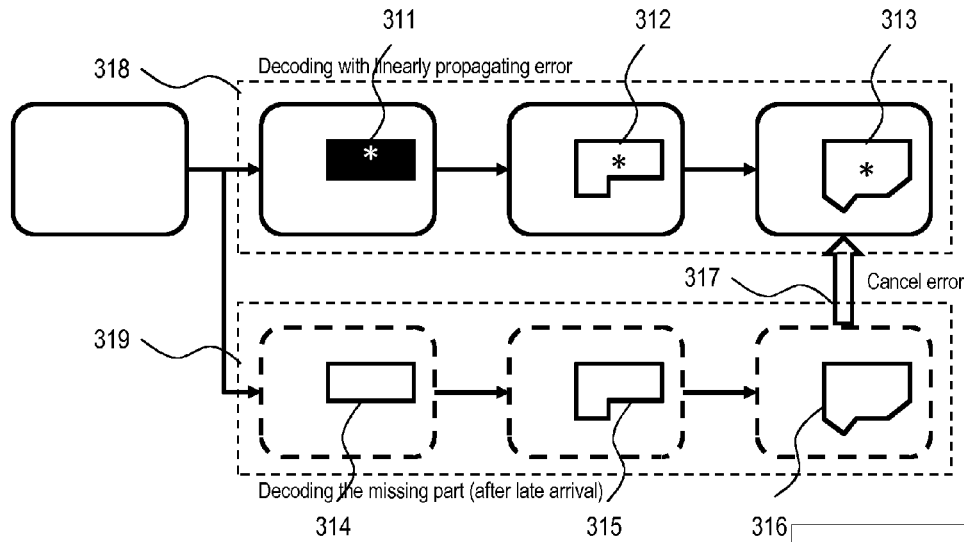
FIG. 3A illustrates a conventional decoding process.

It should be noted that the second technique can be dependent on the decoder's capability to decode a lossy stream. Some current techniques attempt to conceal the errors to make them less annoying to watch until an intra-frame appears and cleans up the image. M. Ghanbari in *IEEE Transactions on Circuits and Systems for Video Technology*, vol. 6, no. 6 (1996) approaches this problem in a single-decoder system by explicitly computing the error having propagated and subtracting it from the latest decoded frame before this is used as a reference frame for the subsequent decoding. Ghanbari's error handling method is adapted to a decoding algorithm that includes motion compensation, which implies that an error may propagate both inside and outside of the area in which it first occurred. Its response to a cell loss is to continue decoding the sequence and use zeros instead of the missing data. For example, referring to FIG. 3a and decoding-with-error section 318 of FIG. 3A, decoding continues even though there has been an error identified and the latest error-free decoded frame can be buffered. When the missing information is restored through receipt of the lost cell, the buffered error-free frame is used as a reference for computing a posteriori what error 311, 312, 313 has propagated from the area containing the error, schematically illustrated by section 319, wherein the error-free versions of the same areas 314, 315, 316 are computed while taking the motion compensation into account. As already pointed out, Ghanbari's error handling method is adapted for use with a completely linear decoding algorithm, so that the decoder is cleaned up by straightforward subtraction 317 of the error, once computed, from the reference frame. The linear decoder then instantly resumes error-free operation.

Some error concealing methods that have emerged in recent years in video coding are of non-linear character and are incompatible with the error handling method proposed by Ghanbari. In some instances, the error concealing methods may not be used together with a decoder that performs non-linear operations inside the decoder loop.

Examples of such contemporary methods are discussed, inter alia, in A. Wang et al., "Error Control and Concealment for Video Communications: A Review", *Proc. of the IEEE*, vol. 86, no. 5, 1998; Kumar et al., "Error Resiliency Schemes in H.264/AVC Standard", *Elsevier Journal of Visual Communication and Image Representation*, vol. 17, no. 2, 2006; and Chen and Chen, "Second-generation error concealment for video transport over error-prone channels", *Proc. Int. Conf. on Image Processing,* 2002. Each of the two first references outlines the "basic" spatial interpolation concealment, as depicted in Kumar et al., FIG. 8. Both references also mention motion-compensated concealment, in which the motion vectors for a lost part of a frame are estimated from neighbouring parts in the same frame or from a previous frame or previous frames. The estimated motion vectors are then used to create an error concealment by copying parts of the previous frame in accordance with the estimated motion. The resulting concealed frames and residual error propagation may be very complex to analyze. Hence, none of these methods lends itself to simple linear error cancellation as proposed by Ghanbari. Furthermore, the references review a number of more advanced schemes, such as interpolation in the transform domain (see Wang et al.), maximally smooth recovery (see Wang et al.) and model-based error concealment (see Chen and Chen). The latter method entails a principal component analysis model which is trained during loss-free decoding, and subsequently used when losses occur to produce a concealment for the lost parts of the modelled object.

The embodiments disclosed herein relate to transmission of video data over communication networks, which enable a combination of satisfactory transmission delay and satisfactory error robustness. In one embodiment, the communication network is a packet-switched digital communication network (e.g., IP network). One possible application of the embodiments is real-time video telephony, in which a low end-to-end delay is desirable in view of user experience.

Figure 3B:
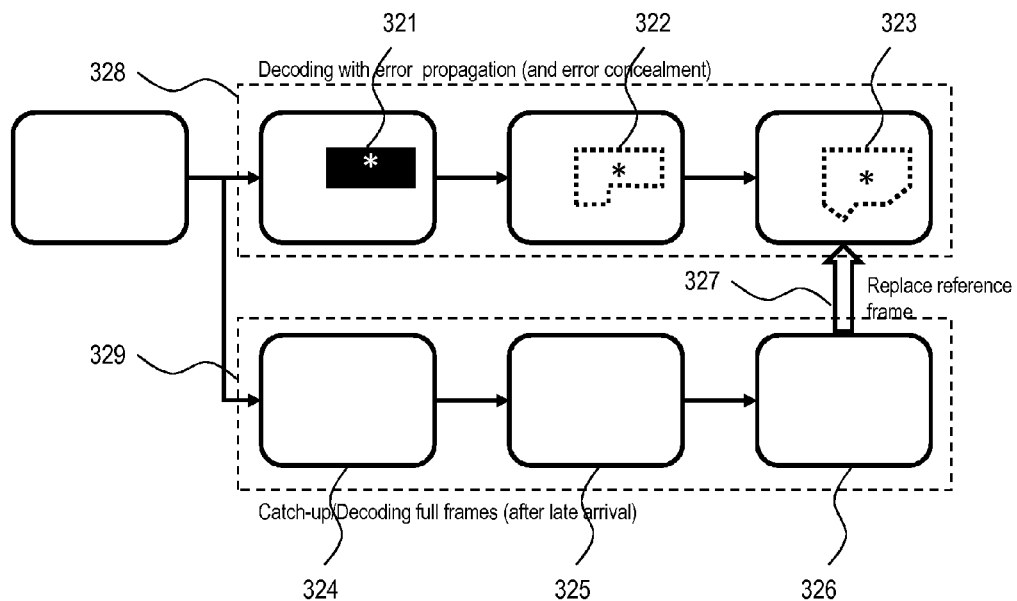
FIG. 3B illustrates a schematic diagram of decoding in a primary and second decoder according to one embodiment.

FIG. 3B illustrates the parallel (and partially overlapping in time) operations of primary and secondary decoders when the former has received an incomplete frame according to one embodiment. Similar to as described above in connection with error 318, the primary decoder then initiates a process 328 of decoding with error propagation. The error 321, 322, 323 propagates outside the sub-region where it originally occurred, so that the error-contaminated area expands and absorbs more and more of the yet error-free portion of the frame. In this embodiment, as indicated by the dotted line, the error is partially concealed by appropriate error-concealing algorithms. In other embodiments, however, error-concealing algorithms may not be used.

When the secondary decoder is supplied with the data (partially or completely) restoring (a sub-region or the entirety of) the incomplete frame, it enters a catch-up process 329, wherein it can compute error-free versions 324, 325, 326 of the latest frames by using the restored incomplete frame as reference. The secondary decoder may have access to the frames received after the incomplete frame, either via an external communication interface common to both the primary and secondary decoder, by a buffer (backlog) arranged in the secondary decoder, by a shift register storing processed encoded frames in the primary decoder or by some similar solution. The error-free versions 324, 325, 326 themselves are generally obtained too late to be displayed and need not be output. In this example, the secondary decoder will have caught up with the primary decoder after three frames, upon which it is possible to restore the state of the primary decoder by copying 327 the entire state of the secondary decoder. The primary decoder can then resume normal, error-free decoding when it has accepted the state received from the secondary decoder (not shown).

Figure 4:
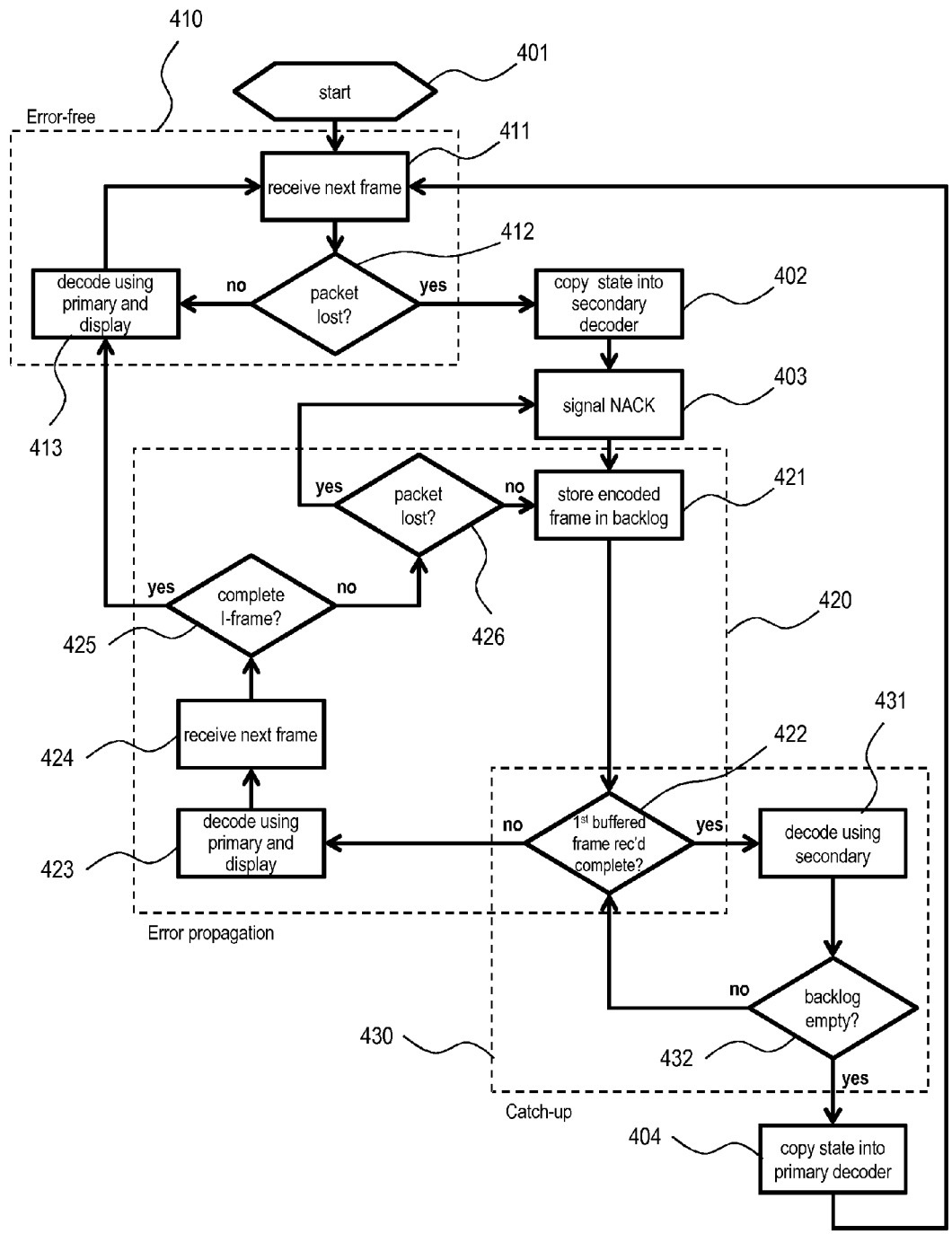
FIG. 4 illustrates a flowchart of an exemplary process of decoding according to one embodiment.

FIG. 4 illustrates a flowchart of an exemplary process of decoding according to one embodiment. The process can be expressed by computer-readable instructions on a data carrier accessible to processing means controlling the primary and secondary decoders of a decoder system. The program or the set of actions to be taken by the processors or decoding devices can be divided into three main sections (or phases or regimes). Transitions between the sections (which are not necessarily separated in time) include: an error-free decoding section 410 corresponding to normal operation performed by the primary decoder, an error-propagating decoding section 420 performed by the primary decoder awaiting data from the secondary decoder that will restore its state, and a catch-up section 430 performed by the secondary decoder.

Figure 5:
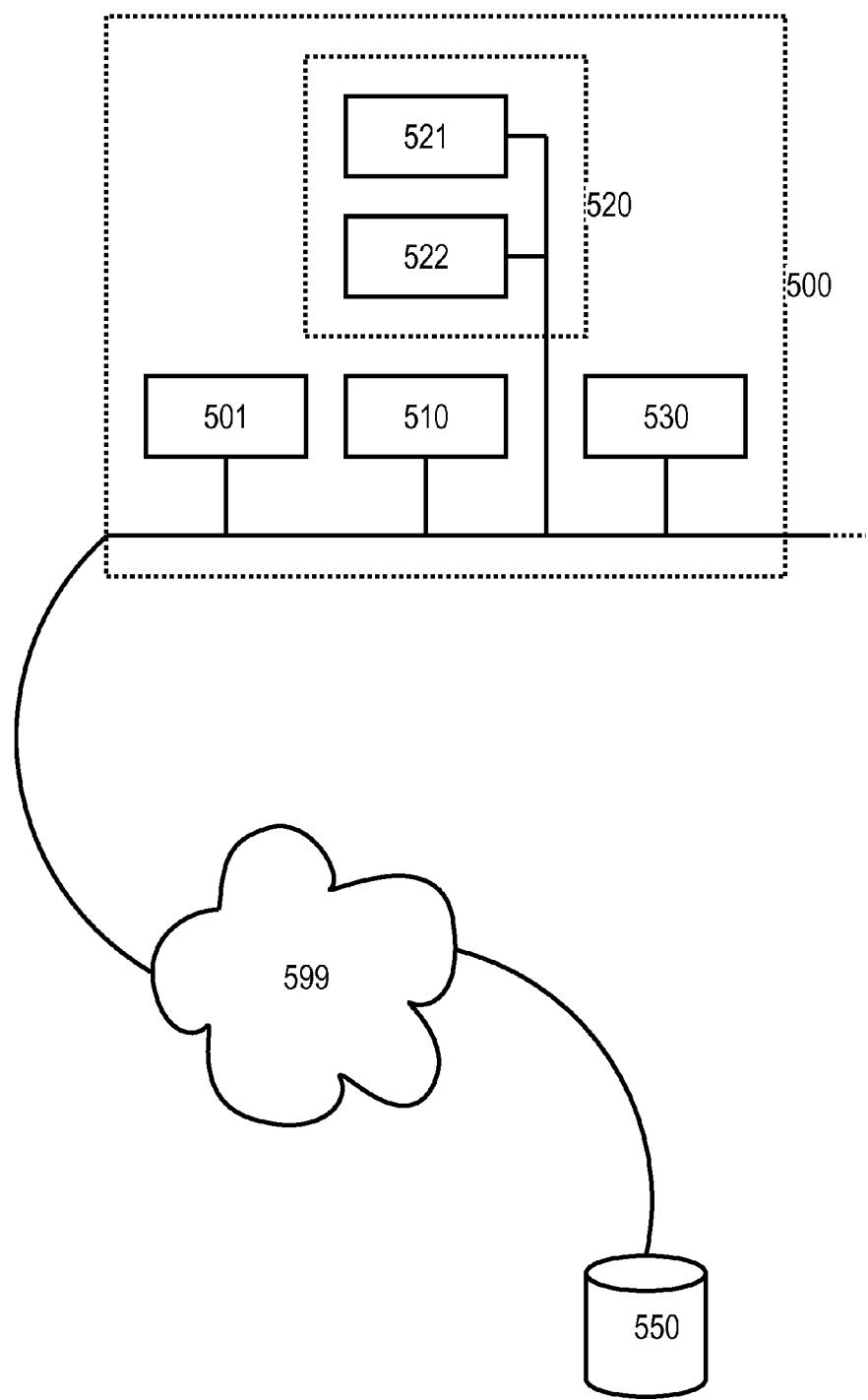
FIG. 5 illustrates a decoding device according to one embodiment, which is connected to a sender via a communication network and which uses the process of FIG. 4.

The flowchart of FIG. 4 may be studied in connection with FIG. 5, which discloses an exemplary hardware structure of a decoder system 500 including a communication interface 501 connected via a communication network 599 to a sender 550, a primary decoder 510, a secondary decoder unit 520—including as sub-units the secondary decoder 521 itself and a backlog 522 and an output interface 530 connectable to a displaying means (not shown). As already noted, the primary and secondary decoders need not be distinct hardware devices but may be two instances of the decoding algorithm executed in parallel by one processing unit.

Beginning at 401, the primary decoder 510 enters error-free section 410 by receiving 411 a new encoded frame and assessing 412 (e.g., by packet sequence numbering, a checksum verification, or other completeness check) whether one or more of its packets has been lost or damaged. If this is not so, the primary decoder proceeds to decoding and displaying 413 the frame. However, if it is established by the primary decoder's assessment that the frame is incomplete, the primary decoder takes measures in order to enter error-propagating section 420, by, for example, copying 402 its actual state into the secondary decoder 520 and by signalling 403, using the communication interface 501, a negative acknowledgement of the frame or a packet within the frame.

In response to the negative acknowledgment, the sender 550 can retransmit the data that were received incomplete. The data that is retransmitted may only be transmitted after sufficient time has elapsed such that the negative acknowledgement reaches the sender 550. The primary decoder may not wait for the negative acknowledgment to reach the sender and can enter a loop including steps 421-426.

At step 421 new frames are stored 421 in the backlog for later processing by the secondary decoder and are decoded 423 by the primary decoder. The primary decoder may apply error concealment techniques during the decoding as discussed previously. When data restoring the incomplete frame are received (not shown), so that the first frame in the backlog is complete 422, the catch-up section 430 of the secondary decoder is initiated in parallel to the error-propagation section 420. The secondary decoder can sequentially decode the frames stored in the backlog, including the restored incomplete frame, until it has caught up with the primary decoder. One suitable condition to determine whether the secondary decoder has caught up with the primary decoder is if the backlog is empty. Alternative catch-up conditions may be that the sequential numbers of frames just processed by the decoders coincide, or that a pre-calculated or dynamically estimated catch-up time has elapsed. Other suitable catch-up conditions are possible. When this has been achieved, the secondary decoder copies 404 its state into the primary decoder, which then exits the loop 421-426 and goes back into error-free decoding 410.

Catch-up is one of the conditions that may interrupt the loop 421-426. Another condition that may interrupt the loop 421-426 is that an I-frame is received 425. As already mentioned, receiving an I-frame can provide the primary decoder with a superior starting point for decoding the subsequent frames rather than a 'cleaned' state provided by the secondary decoder. The primary decoder is therefore adapted to decode the I-frame in the normal fashion and ignore the data expected from the secondary decoder unless a new frame receipt error occurs that necessitates a new catch-up operation. The catch-up section 430 of the secondary decoder is can be cancelled responsive to the receipt 425 of the I-frame, which can economise computing resources.

Secondly, the loop 421-426 may be temporarily suspended if another packet loss occurs 426. In this example, a packet loss in the error-propagation section is handled by signalling 403 a negative acknowledgement to the sender and storing 421 the incomplete frame in the backlog. In contrast to the case of the first initiation of the error-propagation phase, the incomplete frame will not, from the outset, be the oldest data in the backlog. However, it is possible to initiate the catch-up section 430 already when data restoring the first incomplete frame is received; the data restoring the new incomplete frame will not be needed until all frames preceding it in the backlog have been processed by the secondary decoder.

Figure 6:
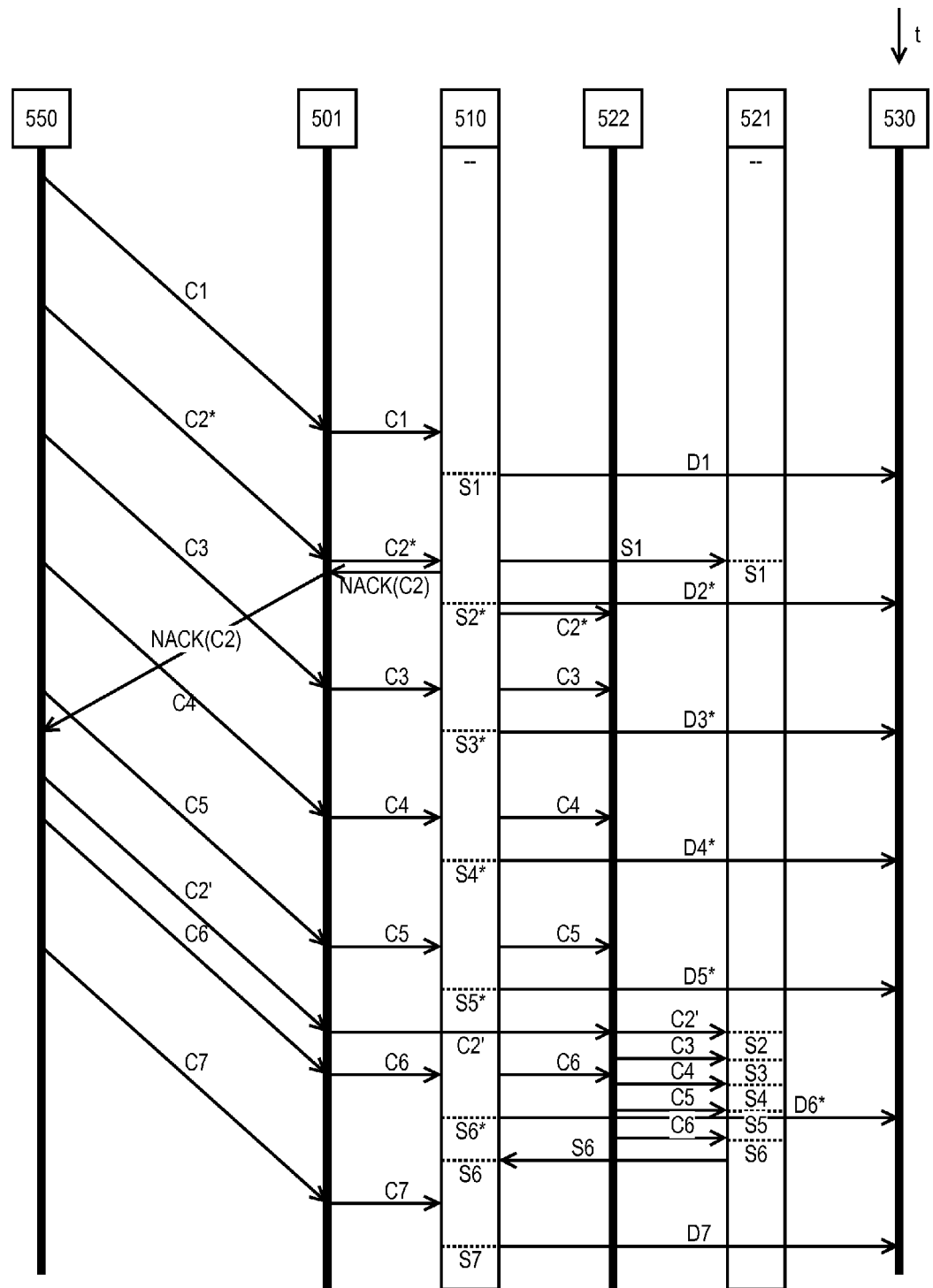
FIG. 6 is a signalling diagram illustrating execution of the process of FIG. 4.

FIG. 6 illustrates an exemplary diagram of the data transmitted between the entities shown in FIG. 5. Each of the entities is illustrated by a vertical bar, those of the decoders being hollow to allow indication of a present state. In the notation, C1, C2, refer to encoded frames according to the order of the video sequence; D1, D2, refer to decoded frames; and S1, S2, refer to decoder states after decoding frames C1, C2, respectively. Further, NACK(C2) denotes a negative acknowledgement of frame C2; star notation C2*, D2*, S2* indicates the presence of errors or deficiencies; and C2' denotes data restoring encoded frame C2* or, equivalently, data C2' from which an error-free, complete frame C2 can be obtained together with the incomplete frame C2*. As indicated by the top right arrow, time elapses in the downward direction of the diagram. It is understood that data transmissions within the decoder system is carried out instantly (horizontal arrows), while transmissions over the communication network 599 will involve some delay (sloping arrows).

Initially, no frames have been decoded, and the states of both the primary 510 and the secondary 521 decoder are empty ("- -"). The first encoded frame C1 is received complete and error-free. After computing the decoded frame D1, the primary decoder 510 forwards this to the output interface 530 and will be in the (error-free) state S1 corresponding to the first frame. The second frame C2* in the sequence is received with errors; the communication interface or the primary decoder may be adapted to establish this fact. The primary decoder takes four actions: to enable a fast catch-up, it instantly transmits the negative acknowledgement of the second frame NACK(C2) to the communication for forwarding to the sender 550; it copies its state S1 into the second decoder 521; after this it decodes the incomplete frame C2* (may use error-concealing) so that an error-containing decoded frame D2* is obtained and supplied to the output interface 530; at an optional point in time, it transmits the incomplete frame C2* to the backlog 522 for later processing. While waiting for the data C2' restoring the incomplete second frame C2*, the primary decoder 510 forwards every new encoded frame C3, C4, C5, . . . to the backlog 522 and outputs decoded frames with (preferably, partially concealed) errors D3*, D4*, D5*, at an even time rate. In contrast, the secondary decoder, when receiving the data C2' restoring the second frame C2*, will not output the decoded frames resulting from its catch-up operation. Normal operation of the decoder system is resumed before the seventh frame C7 is received, prior to which the secondary decoder 521 has copied an error-free state S6, corresponding to the sixth frame, into the primary decoder 510.

Figure 7:
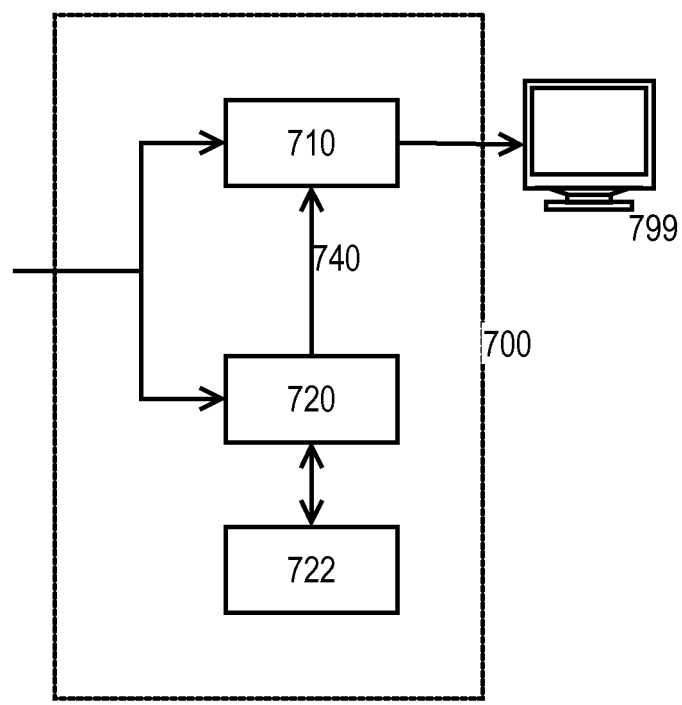
FIG. 7 shows a decoding device according to another embodiment including two decoders operating in parallel and redundantly in normal conditions.

FIG. 7 shows a decoder system comprising a primary decoder 710 and a secondary decoder 720 according to another embodiment. The terms primary and second decoder are used analogously but in a slightly different sense in connection with the present embodiment. The decoder system, in normal conditions (i.e. error-free) carries out the receipt and decoding of video frames in a parallel and redundant fashion. However, the primary decoder 710 is responsible for outputting decoded frames to a display device 799. When an incomplete frame is received, the secondary decoder 720 interrupts its parallel decoding and buffers incoming frames in a backlog 722 until it receives data (completely or partially) restoring the incomplete frame. It then decodes the restored incomplete frame and the subsequent frames, which are retrieved from the backlog, up to a point in the sequence where it has caught up with the primary decoder 710. The secondary decoder 720 now has an error-free state (or a state less deficient than that of the primary decoder 710) and copies this, using a transmission line 740, into the primary decoder 710. After the copying operation, the primary decoder 710 uses a substantially error-free state as reference for its decoding of subsequent frames. Meanwhile, the secondary decoder 720 suitably resumes its normal operational mode including decoding incoming frames parallel to the primary decoder 710.

FIG. 8 illustrates schematically how a chain of three cascaded decoders operate when two incomplete frames are received according to another embodiment. The first row illustrates frames decoded by a first decoder, acting as primary decoder. Below this, the second row illustrates frames decoded by a second decoder configured to act as secondary decoder in respect of the first one. The third row contains frames decoded by a third decoder acting as secondary decoder in respect of the second decoder (it consequently regards the second decoder as its associated primary decoder). In FIG. 8, the frames are aligned in such manner that each column relates to a single frame in the video sequence, or equivalently, that all frames in one column are intended to be displayed at the same point in time.

The first frame 811 in the sequence is received and decoded in an error-free condition. The subsequent frame is received incomplete by the first decoder. Since the first decoder outputs decoded frames with a delay constraint and cannot wait for restoration data, the frame is decoded with an error affecting a portion of the decoded frame 812. The second decoder receives the data restoring the incomplete frame and decodes the second frame 823 and the subsequent one without any errors. The fourth frame, which is received before the second decoder has caught up with the first one, also contains an error affecting another sub-region of the frame. This means that, firstly, the first decoder now outputs a decoded frame with two defective areas and, secondly, that the second decoder is affected by the later error. At receipt of the fourth frame, however, the third decoder is activated, which—after receiving data restoring the fourth encoded frame—produces a fourth and fifth error-free frames 834, 835, after which it restores 851 the state of the second decoder. The second decoder may then replace the error-containing state resulting after decoding the fifth frame 825 by the state received from the third decoder. After decoding the sixth frame 826 without errors, the second decoder cleans up 852 the state of the first decoder, which has hitherto been operating with increasing propagating errors in its output. After the state of the first decoder has been restored to its error-free condition, the decoder system resumes normal operation.

As discussed previously, the embodiments described herein provide a decoding process and hardware enabling a combination of satisfactory transmission delay and satisfactory error robustness. The embodiments are also suitable for real-time video telephony over a communications network for which only a limited least quality of service can be warranted.

The following are examples of embodiments disclosed herein. In one embodiment, a decoder system is provided, which may be embodied as two or more hardware devices for parallel operation or, alternatively, as a single device with a multithreading capability allowing it to execute two parallel decoding processes. The primary decoder is responsible for the (normal) operations of receiving, decoding and outputting a prediction-coded video frame sequence. The secondary decoder has equivalent decoding capabilities—but not necessarily receiving and output capabilities—and is communicatively connected to the primary decoder. When the primary decoder receives an incomplete video frame, it is adapted to take the following actions:

- it copies (clones) its present state into the secondary decoder before decoding the incomplete frame, which state may be used as an initiation state by the secondary decoder;
- it decodes the incomplete frame (upon which the state of the primary decode is impaired by errors) and subsequent frames (upon which the error may have propagated and/or multiplied) until it receives input from the secondary decoder; and
- when it receives a state from the secondary decoder, which state corresponds to the secondary decoder's actual state and may be referred to as a recovery state, it accepts this state as reference for decoding further frames.

The operation of the secondary decoder is triggered by its receipt of the state copied from the primary decoder, at which:

- it accepts the state (initiation state) received from the first decoder;
- it waits until it receives data restoring the incomplete frame, these data being a complete (possibly retransmitted following a request by a section within the decoder) frame, a complete (possibly retransmitted) sub-region of a frame or an adapted correction replacing an erroneous portion or restoring an incomplete portion into a less error-containing condition;
- it decodes the restored incomplete frame and subsequent frames until it has caught up with the primary decoder; and
- it copies its actual state (recovery state) into the primary decoder.

The decoder is primarily intended to be deployed on a receiver side of a wired or wireless transmission link.

In another embodiment, a decoder system with the following features are provided. The decoder system includes a state-dependent primary decoder for receiving, decoding and outputting the sequence and a state-dependent secondary decoder for receiving and decoding the sequence in parallel to the primary decoder. A connection from the secondary decoder to the primary decoder allows data transmission, at least of state data and at least in that direction. The secondary decoder is adapted to respond to receipt of an incomplete frame by:

- interrupting its decoding until it receives data restoring the incomplete frame;
- decoding the restored incomplete frame and subsequent frames until it has caught up with the primary decoder; and
- copying its state into the primary decoder.

In this condition, the primary decoder is adapted to respond to receipt of an incomplete frame by accepting the state.

The two decoder systems differ in that the supporting decoder is provided with the data representing the actual state of the main decoder in two different fashions: either by receiving a copy from the main decoder when the main decoder has detected an incomplete frame, or by operating in parallel with the main decoder so that its state coincides with that of the main decoder continuously, except when a catch-up procedure has been initiated following receipt of an incomplete frame. Thus, copying of the state from a secondary decoder, operating without any delay constraint, into a first decoder, operating under a particular delay constraint, reduces the impact on the first decoder of incorrect or missing information resulting from the particular delay constraint in conjunction with transmission delay or data loss. The propagation of errors in the sequence of decoded frames output from the first decoder constitutes such an undesirable impact on the decoder.

In another embodiment, a decoder for acting as a primary decoder is provided, being adapted to receive, decode and output a sequence of prediction-coded video frames in cooperation with a further decoder with equivalent capabilities as regards decoding and acting as secondary decoder. On receipt of an incomplete frame, the decoder performs the following steps:

- it copies the state into the secondary decoder, with which it cooperates, before decoding the incomplete frame;
- it configures itself to forward all subsequent frames to the secondary decoder;
- it configures itself to forward data restoring the incomplete frame to the secondary decoder;
- it decodes and outputs the incomplete frame as well as subsequent frames; and
- when it receives a state copied from the secondary decoder, it accepts this state as reference for its future decoding operation.

In another embodiment, a decoder is provided for acting as a secondary decoder so as to support a decoder, acting as primary, when the latter receives an incomplete frame and copies its state to the secondary decoder. The secondary decoder then performs the following steps:

- it accepts the state;
- it receives and buffers frames following the incomplete frame;
- it receives data restoring the incomplete frame;
- it decodes the incomplete frame restored by the received data;

it decodes the buffered frames following the incomplete frame; and it copies the state resulting after the decoding operations into the primary decoder.

For the purposes of this and other aspects of the embodiments, it is noted that the data restoring the incomplete frame may be a corrected version of the entire incomplete frame, in which case the secondary decoder does not need to receive the incomplete frame itself. The data may also refer to only a missing or damaged portion (e.g., a packet) of the incomplete frame, wherein the restoring data and the incomplete frame are provided to the secondary decoder. The incomplete frame and the restoring data need not be transmitted concurrently.

In another embodiment, a method is provided for decoding a prediction-coded sequence of video frames using a primary and a secondary state-dependent decoder. In normal operation, the primary decoder receives, decodes and outputs complete, error-free frames. The method includes the following steps:

the primary decoder receives an incomplete frame;

the primary decoder copies its state into the secondary decoder;

the primary decoder decodes and outputs the incomplete frame and subsequent frames;

the secondary decoder is provided with the incomplete frame and data restoring the incomplete frame, these items being relayed to it by the primary decoder, supplied by a receiving means common to both decoders, or in some other way;

the secondary decoder decodes the incomplete frame thus restored—preferably without outputting the decoded frame and preferably at maximum processing speed—as well as subsequent frames until it has caught up with the primary decoder; and the secondary decoder copies its state into the primary decoder.

In another embodiment, a computer-program product is provided for carrying out any of the above methods.

As used in this disclosure, an incomplete video frame is one that contains errors or consists of at least one portion (e.g., sub-region, macroblock, sub-frame or data packet) that is not delivered or is delivered with non-negligible delay. The embodiments are not limited to the case of complete restoration of an incomplete or defective frame, but may also be applied in situations where data partially restoring the frame are received. Then, the state copied from the secondary decoder into the primary decoder will not be completely error-free, but will contain relatively fewer error so that it may be reasonable expected that the output quality of the primary decoder will be improved.

The secondary decoder may be deemed to have caught up with the primary decoder when it has advanced so far that there is time (i) for the secondary decoder to copy its state into the primary decoder, (ii) for the primary decoder to decode a new frame using the copied state as reference; and (iii) for the primary decoder to output the result without delay. The delay may be defined relative to an intended output rate, such as a playback rate corresponding to the recording rate of the video. This catching-up condition can be varied, though preferably not in an overly conservative fashion by which excessive amounts of time is allowed for these operations, as this will increase the time during which the primary decoder is operating with errors.

The embodiments permit the primary decoder to continue playback without interruption when an incomplete frame is received. Supposing the decoder is adapted to observe a delay between receipt and display of a frame, which then serves the purpose of absorbing temporary jitter and other fluctuations, it will be possible with the embodiments to continue playback without interruption even if this delay is moderate, because, indeed, the delay does not need to include the time for requesting and receiving a retransmitted (portion of a) frame. Further, the primary decoder will receive an error-free condition as soon as the secondary decoder is able to provide it with error-free state information for use as reference during the subsequent decoding.

The embodiments also can respond to packet loss by performing decoding with error concealment until an I-frame arrives and 'cleans' the decoder state. For non-linear error concealment methods, where error cancelling is not straightforward even though the lost packet has been restored, the embodiments shorten the time during which the decoder is running with error propagation.

In another embodiment, the primary decoder may be adapted to output decoded frames at real-time rate, that is, the playback takes place approximately at the frame rate used for recording. The frame rate may be the same as the encoder uses. In practice, real-time playback amounts to the decoder being constrained to output decoded frames while respecting a maximum admissible separation of consecutive frames. To enable this, firstly, the secondary decoder can be provided with a backlog (or buffer) for temporarily storing those frames which follow after the incomplete frame; this buffering may be disregarded after the secondary decoder has caught up with the primary decoder. The backlog may be provided outside the secondary decoder, for example, in a receiver common to the entire decoder system, provided it is accessible to the secondary decoder. Secondly, the secondary decoder is adapted to carry out its decoding operations faster than the real-time rate. Preferably, the secondary decoder is adapted to decode the incomplete frame, once restored, and the subsequent frames at the maximum available processing speed. This embodiment may be used in real-time applications, such as real-time video telephony.

In another embodiment, the primary and secondary decoders may be adapted to handle a prediction-coded video sequence which includes at least one self-contained frame. The self-contained frames in the sequence may be intra-frames (I-frames), as described above. The primary decoder is adapted to respond to receipt of a complete (and correct) self-contained frame by resetting its state and decoding and outputting the self-contained frame. For subsequent frames, the state resulting after the decoding of the self-contained frame is used as reference. In this condition, if a support operation by the secondary decoder is in progress, its resulting output state (corresponding to an error-free, prediction-decoded frame) is not likely to improve the decoding quality, as it appears further away from the latest self-contained frame. Therefore, in this embodiment, the primary decoder may preferably reject any state copied from the secondary decoder until it receives an incomplete frame, which triggers a new support operation. Hence, the decoding system makes full use of the potential for quality improvement that the interleaved self-contained frames represent.

In a variation to the preceding embodiment, the secondary decoder may become aware of the primary decoder's receipt of a self-contained frame. This may be achieved by virtue of a communicative connection between the secondary decoder and the section used for receiving the frame, by a notification sent from the primary decoder or the like. The secondary decoder is then able to cancel the decoding of the restored incomplete frame and the subsequent frames. The cancelling may consist in deleting the frames in the backlog or, if the catch-up decoding has already started, in stopping this operation. This releases processing capacity, which is especially beneficial in connection with a multithreaded embodiment, in which both the primary and secondary decoding are executed by the same processing unit.

In another embodiment, the primary decoder may apply error concealment in the period from receipt of an incomplete frame and until its state is restored to an error-free condition using the data transmitted from the secondary decoder when this has accomplished its catch-up operation. The error concealment may comprise linear or non-linear algorithms for making the error less perceptible to a human viewer, such as noise shaping in accordance with psycho-acoustic or psycho-visual facts. Extrapolation models, by which a current frame containing errors is corrected on the basis of one or more preceding frames may be applied, possibly supplemented by educated guesses derived from an earlier observed behaviour of the video sequence. Further, different measures may be taken in order to limit the propagation of the error between consecutive frames and between sub-regions of the image. Specific examples of error concealment techniques have been given above.

In another embodiment, which can be arranged at the receiver at one end of a transmission link, the primary or the secondary decoder is adapted to notify the sender, at the other side of the link, that a frame has been lost or received in an faulty or incomplete condition. The notification may be based on positive acknowledgement, wherein the absence of a positive acknowledgement communication indicates a faulty transmission and may trigger the sender to retransmit. It may also be based on negative acknowledgement (NACK) of the transmitted items, that is, the receiver returns a communication to the sender if an unexpected delay occurs or if a transmitted item (e.g., burst, packet, frame) is received incomplete or damaged. As a variation, the sender may send acknowledgement communications at every receiving event, including therein whether the data were received correctly or incorrectly. The sender may specify exactly what portion of the data needs to be retransmitted, so as to avoid unnecessary data traffic on the transmission link. Acknowledgement communications along the lines of this paragraph may also be used for adaptive control of the parameters determining the properties of the transmission link, so that economic use of the resources is achieved.

In another embodiment, a plurality of decoders are arranged in a chain of devices adapted to support one another in a hierarchically ordered fashion. Thus, a specific decoder in such a chain may function as a secondary decoder in respect of one of its neighbours, which it helps clean up the decoder state if it receives an incomplete frame, while its other neighbour may be configured to regard the specific decoder as its primary, thus being prepared to support it when it is affected by a transmission error. Hence, one embodiment provides an ordered chain of three or more decoders.

Features from two or more embodiments outlined above can be combined, unless they are clearly incompatible, in further embodiments. Likewise, further embodiments can also be provided through the omission of certain features that are not necessary or not essential for the desired purpose.

The above-described embodiments of encoding or decoding illustrate some exemplary encoding techniques. However, it shall be understood that encoding and decoding as those terms are used in the claims are understood to mean compression, decompression, transformation or any other processing or change of data.

The embodiments of primary and secondary decoders (and the algorithms, methods, instructions etc. stored thereon and/or executed thereby) can be realized in hardware including, for example, Intellectual Property (IP) cores, ASICS, programmable logic arrays, optical processors, programmable logic controllers, microcode, microcontrollers, servers, microprocessors, digital signal processors or any other suitable circuit. In the claims, the term "processor" should be understood as encompassing any the foregoing, either singly or in combination. The terms "signal" and "data" are used interchangeably. Further, portions of the primary and second decoders do not necessarily have to be implemented in the same manner.

Further, in one embodiment, for example, primary decoder and/or secondary decoder can be implemented using a general purpose computer/processor with a computer program that, when executed, carries out any of the respective methods, algorithms and/or instructions described herein. As discussed previously, the decoding on primary and secondary decoders can be implemented on the same processor or two or more different processors. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. For example, the medium can include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a processor. Other suitable mediums are also available.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method comprising:
   decoding a first decoded first video frame corresponding to a first video frame of a video stream by:
   identifying a first encoded first video frame portion corresponding to the first video frame of the video stream,
   generating a copy of a state of a primary decoder, and
   generating, by the primary decoder, the first decoded first video frame based on the first encoded first video frame portion such that the first decoded first video frame includes a first error;
   decoding a first decoded second video frame corresponding to a second video frame of the video stream by:
   identifying an encoded second video frame corresponding to the second video frame of the video stream, and
   generating, by the primary decoder, the first decoded second video frame based on the encoded second video frame and the first decoded first video frame such that the first decoded second video frame includes a second error corresponding to the first error;
  decoding a second decoded first video frame corresponding to the first video frame of the video stream by:
    identifying a second encoded first video frame portion corresponding to the first video frame of the video stream, and
    generating, by a secondary decoder, the second decoded first video frame based on the first encoded first video frame portion, the second encoded first video frame portion, and the copy of the state of the primary decoder, such that the second decoded first video frame does not include the first error;
  decoding a second decoded second video frame corresponding to the second video frame of the video stream by:
    generating, by the secondary decoder, the second decoded second video frame based on the encoded second video frame and the second decoded first video frame such that the second decoded second video frame does not include an error corresponding to the first error;
  decoding a decoded third video frame corresponding to a third video frame of the video stream by:
    identifying an encoded third video frame corresponding to the third video frame of the video stream, and
    generating, by the primary decoder, the decoded third video frame based on the encoded third video frame and a copy of a state of the secondary decoder, such that the decoded third video frame does not include an error corresponding to the first error; and
  outputting the first decoded first video frame, the first decoded second video frame, and the decoded third video frame.

2. The method of claim 1, wherein the copy of the state of the primary decoder includes an indication of a reference video frame.

3. The method of claim 2, wherein generating the first decoded first video frame includes predicting the first decoded first video frame with reference to the reference video frame.

4. The method of claim 2, wherein generating the second decoded first video frame includes predicting the second decoded first video frame with reference to the reference video frame.

5. The method of claim 2, wherein generating the first decoded second video frame includes predicting the first decoded second video frame with reference to the first decoded first video frame.

6. The method of claim 2, wherein generating the second decoded second video frame includes predicting the second decoded second video frame with reference to the second decoded first video frame.

7. The method of claim 1, wherein the first video frame immediately precedes the second video frame in the video stream, and the second video frame immediately precedes the third video frame in the video stream.

8. The method of claim 1, wherein decoding the first decoded first video frame includes receiving the first encoded first video frame portion.

9. The method of claim 1, wherein decoding the first decoded first video frame includes determining that the first encoded first video frame portion is an incomplete video frame.

10. The method of claim 1, wherein generating the copy of the state of the primary decoder includes copying the state of the primary decoder into the secondary decoder.

11. The method of claim 1, wherein decoding the second decoded first video frame is performed in response to receiving the second encoded first video frame portion.

12. The method of claim 1, wherein generating the first decoded first video frame includes performing error concealment, by the primary decoder, to conceal the first error.

13. The method of claim 1, wherein generating the first decoded second video frame includes performing error concealment, by the primary decoder, to conceal the second error.

14. The method of claim 1, wherein the primary decoder operates at a first rate and the secondary decoder operates at a second rate, wherein the first rate is at least a frame rate of the video stream and the second rate is greater than the first rate.

15. A method comprising:
  decoding, by a primary decoder, a first decoded first video frame corresponding to a first video frame of a video stream, the first decoded first video frame based on a first encoded first video frame portion corresponding to the first video frame, such that the first decoded first video frame includes a first decoding error;
  decoding, by the primary decoder, a first decoded second video frame corresponding to a second video frame of the video stream, the first decoded second video frame based on a first encoded second video frame portion corresponding to the second video frame, such that the first decoded second video frame includes a propagation error corresponding to the first decoding error and a second decoding error;
  decoding, by the primary decoder, a first decoded third video frame corresponding to a third video frame of the video stream, such that the first decoded third video frame includes a propagation error corresponding to the first decoding error and a propagation error corresponding to the second decoding error;
  decoding, by a first secondary decoder, a second decoded first video frame corresponding to the first video frame, the second decoded first video frame based on the first encoded first video frame portion, a second encoded first video frame portion corresponding to the first video frame, and a state of the primary decoder corresponding with the first video frame, such that the second decoded first video frame does not include the first decoding error;
  decoding, by the first secondary decoder, a second decoded second video frame corresponding to the second video frame, such that the second decoded second video frame includes the second decoding error and does not include a propagation error corresponding to the first decoding error;
  decoding, by a second secondary decoder, a third decoded second video frame corresponding to the second video frame, the third decoded second video frame based on the first encoded second video frame portion, a second encoded second video frame portion corresponding to the second video frame, and a state of the first secondary decoder corresponding with the second video frame, such that the third decoded second video frame does not include the first decoding error and the third decoded second video frame does not include the second decoding error;
  decoding, by the first secondary decoder, a second decoded third video frame corresponding to the third video frame, the second decoded third video frame based on the encoded third video frame and a state of the second secondary decoder corresponding with the second video frame, such that the second decoded third video frame does not include a propagation error corresponding to the first decoding error and the second decoded third video frame does not include a propagation error corresponding to the second decoding error;

decoding, by the primary decoder, a decoded fourth video frame corresponding to a fourth video frame of the video stream, the decoded fourth video frame based on an encoded fourth video frame corresponding to the fourth video frame and a state of the first secondary decoder corresponding with the third video frame, such that the decoded fourth video frame does not include a propagation error corresponding to the first decoding error and the decoded fourth video frame does not include a propagation error corresponding to the second decoding error; and outputting the first decoded first video frame, the first decoded second video frame, the first decoded third video frame, and the first decoded fourth video frame.

* * * * *